United States Patent
Beneveniste

(10) Patent No.: US 6,980,542 B2
(45) Date of Patent: Dec. 27, 2005

(54) POLL SCHEDULING FOR PERIODIC UPLINK AND DOWNLINK TRAFFIC

(75) Inventor: Mathilde Benveniste, South Orange, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 249 days.

(21) Appl. No.: 10/673,709

(22) Filed: Sep. 29, 2003

(65) Prior Publication Data

US 2004/0120354 A1 Jun. 24, 2004

Related U.S. Application Data

(60) Provisional application No. 60/433,604, filed on Dec. 16, 2002.

(51) Int. Cl.[7] ............................................... H04J 3/16
(52) U.S. Cl. ..................... 370/346; 370/449; 370/508
(58) Field of Search ........................ 370/503, 508, 370/516, 519, 517, 431, 442, 443, 477, 345, 370/346, 347, 348, 349, 350, 428, 412, 395.4, 370/445, 447, 429, 449

(56) References Cited

U.S. PATENT DOCUMENTS

| | | | | |
|---|---|---|---|---|
| 6,654,957 | B1 * | 11/2003 | Moore et al. | 725/111 |
| 6,747,968 | B1 * | 6/2004 | Seppala et al. | 370/338 |
| 2003/0081588 | A1 * | 5/2003 | Simbirski et al. | 370/346 |
| 2003/0137986 | A1 * | 7/2003 | Kaku et al. | 370/449 |
| 2003/0149971 | A1 * | 8/2003 | Basil et al. | 725/16 |
| 2003/0198244 | A1 * | 10/2003 | Ho et al. | 370/442 |

* cited by examiner

Primary Examiner—Brian Nguyen
(74) Attorney, Agent, or Firm—Chapin & Huang, LLC; David W. Rouille, Esq.

(57) ABSTRACT

An apparatus and method for polling stations that transmit and receive periodic traffic streams are disclosed. The illustrative embodiment determines when to transmit a frame comprising a data payload and a poll to a station based on (i) the temporal period and temporal offset of the traffic stream transmitted by the station, and (ii) the temporal period and temporal offset of the traffic stream received by the station, such that delays for either the transmitted traffic stream or the received traffic stream are reduced. The present invention is particularly advantageous for latency-sensitive applications such as voice and video telecommunications.

20 Claims, 8 Drawing Sheets

POLL SCHEDULING FOR PERIODIC UPLINK AND DOWNLINK TRAFFIC

REFERENCE TO RELATED APPLICATIONS

This application claims the benefit of U.S. Provisional Patent Application No. 60/433,604, filed on 16 Dec. 2002, entitled "Poll Scheduling and Power Saving," which is also incorporated by reference.

FIELD OF THE INVENTION

The present invention relates to telecommunications in general, and, more particularly, to poll scheduling for periodic traffic sources.

BACKGROUND OF THE INVENTION

FIG. 1 depicts a schematic diagram of an exemplary wireless local-area network (LAN) 100 in the prior art comprising access point 101, stations 102-1 through 102-N, wherein N is a positive integer, and hosts 103-1 through 103-N, interconnected as shown. Each station 102-i, wherein i is a member of the set $\{1, 2, \ldots N\}$, enables respective host 103-i (a device such as a notebook computer, personal digital assistant [PDA], tablet PC, etc.) to communicate wirelessly with other hosts in local-area network 100 via access point 101.

Access point 101 and stations 102-1 through 102-N transmit blocks of data called frames. A frame typically comprises a data portion, referred to as a payload, and a control portion, referred to as a header. Frames transmitted from a station 102-i to access point 101 are referred to as uplink frames, and frames transmitted from access point 101 to a station 102-i are referred to as downlink frames. A series of frames transmitted from a station 102-i to access point 101 is referred to as an uplink traffic stream, or simply an uplink stream, and a series of frames transmitted from access point 101 to a station 102-i is referred to as a downlink traffic stream, or simply a downlink stream.

Access point 101 and stations 102-1 through 102-N transmit frames over a shared-communications channel such that if two or more stations (or an access point and a station) transmit frames simultaneously, then one or more of the frames can become corrupted (resulting in a collision). Consequently, local-area networks typically employ protocols for ensuring that a station or access point can gain exclusive access to the shared-communications channel for an interval of time in order to transmit one or more frames.

Such protocols can be classified into two types: contention-based protocols, and contention-free protocols. In a contention-based protocol, stations 102-1 through 102-N and access point 101 compete to gain exclusive access to the shared-communications channel, just as, for example, several children might fight to grab a telephone to make a call.

In a contention-free protocol, in contrast, a coordinator (e.g., access point 101, etc.) grants access to the shared-communications channel to one station at a time. An analogy for contention-free protocols is a parent (i.e., the coordinator) granting each of several children a limited amount of time on the telephone to talk, one at a time. One technique in which a coordinator can grant access to the shared-communications channel is polling. In protocols that employ polling, a station that wishes to be polled submits a polling request (also referred to as a reservation request) to the coordinator. The coordinator subsequently sends a poll to the requesting station, granting that station exclusive access to the shared-communications channel for an interval of time. Since the coordinator polls only one station at a time, and stations transmit only in response to a poll from the coordinator, polling-based protocols can provide contention-free access to the shared-communications channel.

In some local-area networks where access point 101 acts as the coordinator, such as those based on the Institute of Electrical and Electronics Engineers (IEEE) 802.11 standard, access point 101 combines, when possible, a payload and a poll into a single downlink frame. For the purposes of this specification, such a frame is referred to as a downlink data/poll frame.

SUMMARY OF THE INVENTION

The present invention enables a station that (i) queues a frame for transmission on a periodic basis, and (ii) receives frames that are queued for transmission on a periodic basis by another station, to be polled without some of the costs and disadvantages for doing so in the prior art. In particular, the illustrative embodiment determines when to transmit a downlink data/poll frame to such a station based on (i) the temporal period, or periodicity, of the station's uplink traffic stream;
(ii) the temporal offset, or phase, of the station's uplink traffic stream;
(iii) the temporal period of the downlink traffic stream to the station; and
(iv) the temporal offset of the downlink traffic stream to the station;

such that delays for either the downlink traffic stream or the uplink traffic stream are reduced. This is especially advantageous for latency-sensitive applications such as voice and video telecommunications.

In the illustrative embodiment, the access point transmits downlink data/poll frames either (i) soon after the access point receives a frame for forwarding to the station, thereby reducing the delay of downlink frames, or (ii) such that the downlink data/poll frame arrives at the station soon after the station has generated a frame for transmission, thereby reducing the delay of uplink frames. The access point selects from (i) and (ii) based on the resultant delays for the non-selected stream. (For example, if selecting (i) results in a 5 millisecond delay for uplink frames, and selecting (ii) results in a 9 millisecond delay for downlink frames, then (i) is selected.)

The illustrative embodiment comprises: receiving (i) a temporal period $\pi$, (ii) a first temporal offset $\phi_1$ for a first stream of frames generated by a first device in accordance with the temporal period $\pi$, and (iii) a second temporal offset $\phi_2$ for a second stream of frames that arrives at a second device in accordance with the temporal period $\pi$, wherein the second stream of frames is for forwarding to the first device; and determining a third temporal offset $\phi_3$ based on at least one of $\phi_1$ and $\phi_2$ for a third stream of frames transmitted from the second device to the first device in accordance with the temporal period $\pi$, wherein each frame of the third stream comprises a poll and a payload of a respective frame of the second stream.

DETAILED DESCRIPTION

Figure 1:
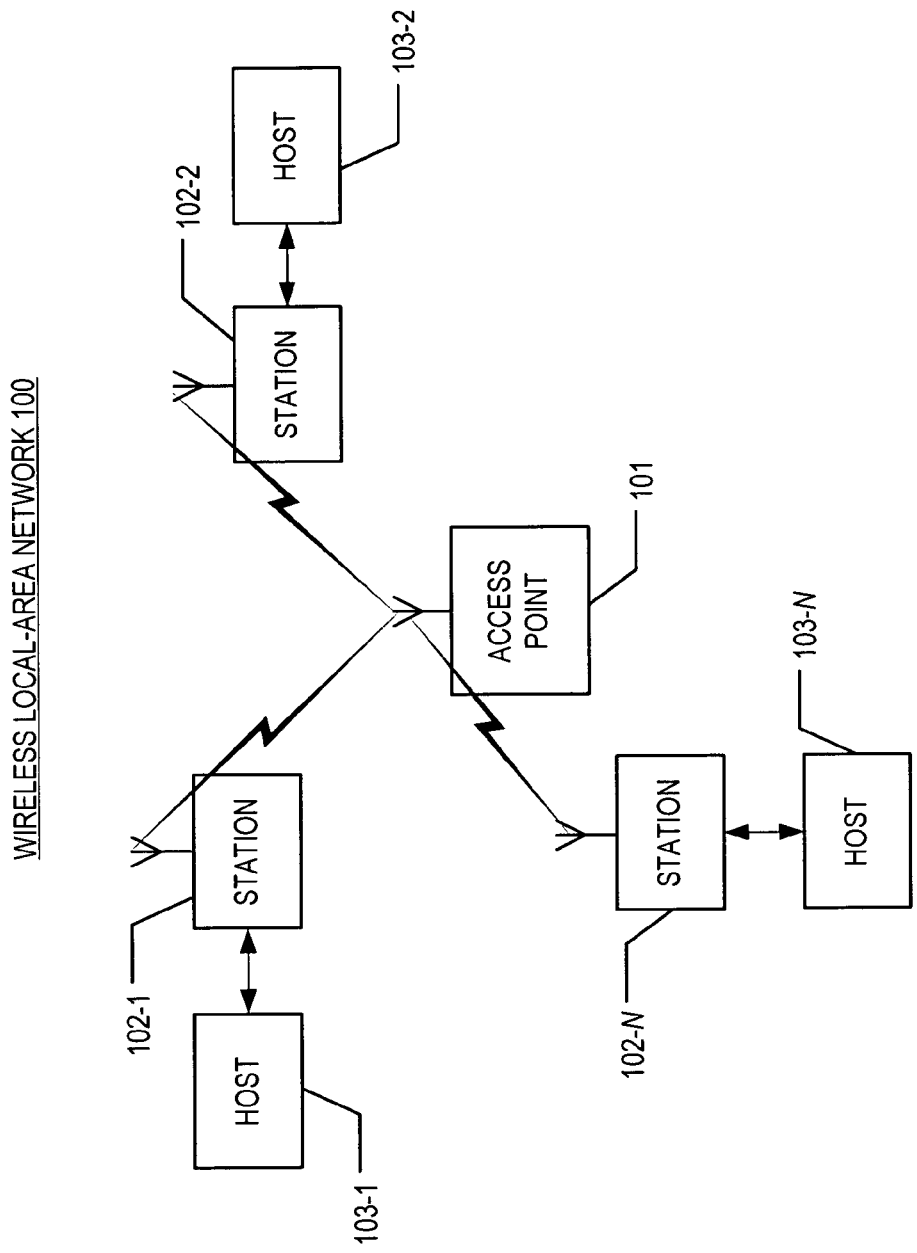
FIG. 1 depicts a schematic diagram of an exemplary wireless local-area network 100 in the prior art.
Figure 2:
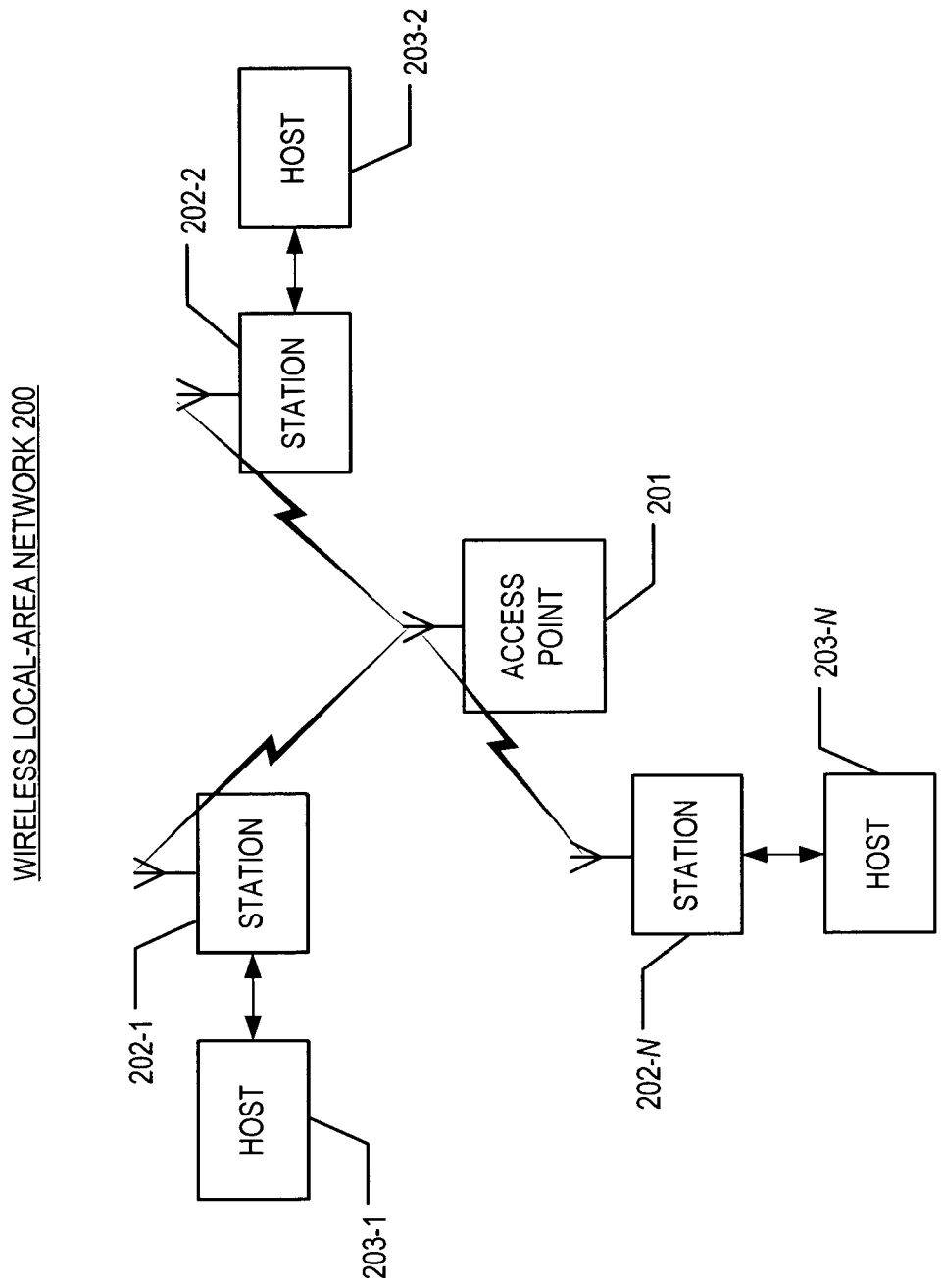
FIG. 2 depicts a schematic diagram of a portion of local area network 200 in accordance with the illustrative embodiment of the present invention.

FIG. 2 depicts a schematic diagram of local-area network 200 in accordance with the illustrative embodiment of the present invention. Local-area network 200 comprises access point 201, stations 202-1 through 202-N, wherein N is a positive integer, and hosts 203-1 through 203-N, interconnected as shown.

As shown in FIG. 2, each station 202-i, wherein i is a member of the set $\{1, 2, \ldots N\}$, is associated with a respective host 203-i, and enables host 203-i to communicate wirelessly with other hosts in local-area network 200 via access point 201.

Host 203-i is a device (e.g., notebook computer, personal digital assistants [PDA], tablet PCs, etc.) capable of generating data payloads and transmitting those data payloads to station 202-i. Host 203-i is also capable of receiving data payloads from station 202-i, and of processing and using the data contained within those data payloads.

Station 202-i is capable of receiving data payloads from host 203-i and of transmitting frames that comprise the data received from host 203-i over a shared-communications channel. Station 202-i is also capable of receiving frames from a shared-communications channel and sending data payloads comprising data from the frames to host 203-i.

Access point 201 receives uplink frames from one or more of stations 202-1 through 202-N, and transmits downlink data/poll frames to one or more of stations 202-1 through 202-N as described below and with respect to FIG. 6 through FIG. 8.

Architectures for access point 201 and station 202-i are described below and with respect to FIG. 3 and FIG. 4, respectively. It will be clear to those skilled in the art, after reading this specification, how to make and use access point 201 and station 202-i.

Figure 3:
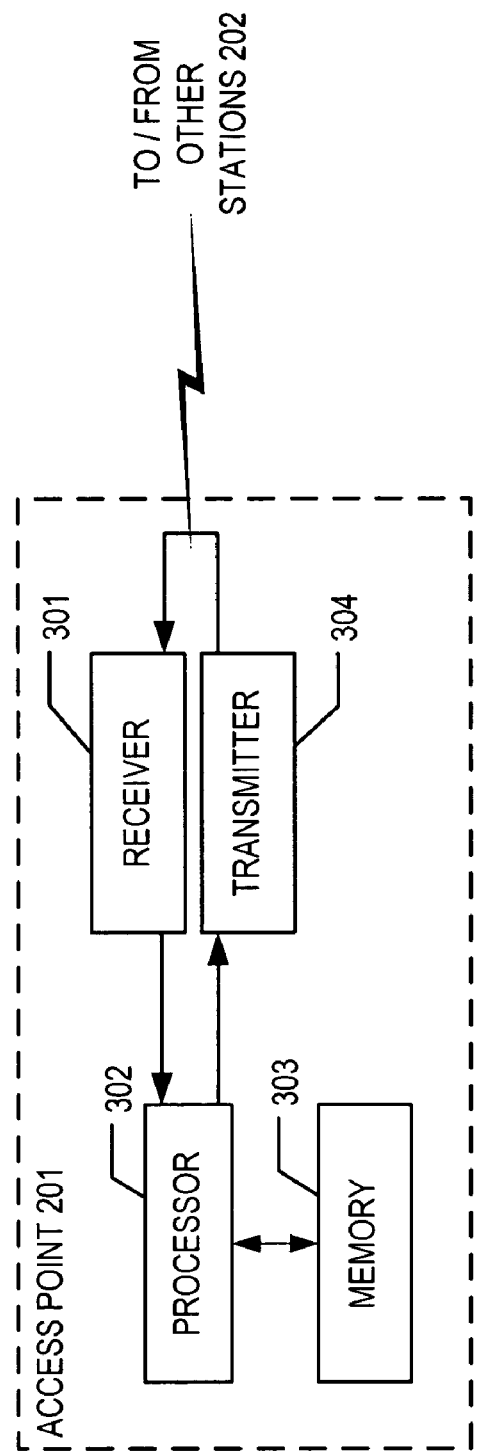
FIG. 3 depicts a block diagram of the salient components of access point 201, as shown in FIG. 2, in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown.

Receiver 301 is a circuit that is capable of receiving frames from shared-communications channel 203, in well-known fashion, and of forwarding them to processor 302. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIG. 6 through FIG. 8. In some alternative embodiments of the present invention, processor 302 might be a special-purpose processor. In either case, it will be clear to those skilled in the art how to make and use processor 302.

Memory 303 is capable of storing programs and data used by processor 302, as is well-known in the art, and might be any combination of random-access memory (RAM), flash memory, disk drive, etc. It will be clear to those skilled in the art how to make and use memory 303.

Transmitter 304 is a circuit that is capable of receiving frames from processor 302, in well-known fashion, and of transmitting them on shared-communications channel 203. It will be clear to those skilled in the art how to make and use transmitter 304.

Figure 4:
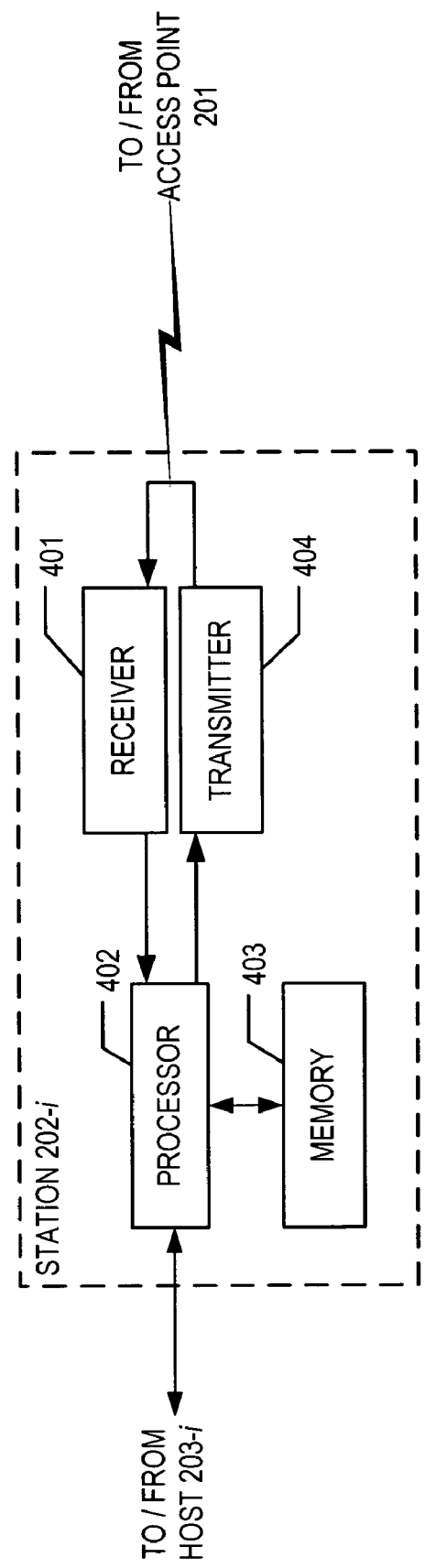
FIG. 4 depicts a block diagram of the salient components of station 202-i, as shown in FIG. 2, in accordance with the illustrative embodiment of the present invention.

FIG. 4 depicts a block diagram of the salient components of station 202-i, wherein $i \in \{1, 2, \ldots, N\}$, in accordance with the illustrative embodiment of the present invention. Station 202-i comprises receiver 401, processor 402, memory 403, and transmitter 404, interconnected as shown.

Receiver 401 is a circuit that is capable of receiving frames from shared-communications channel 203, in well-known fashion, and of forwarding them to processor 402. It will be clear to those skilled in the art how to make and use receiver 401.

Processor 402 is a general-purpose processor that is capable of executing instructions stored in memory 403, and of reading data from and writing data into memory 403. In some alternative embodiments of the present invention, processor 402 might be a special-purpose processor. In either case, it will be clear to those skilled in the art, after reading this disclosure, how to make and use processor 402.

Memory 403 is capable of storing programs and data used by processor 402, as is well-known in the art, and might be any combination of random-access memory (RAM), flash memory, disk drive, etc. It will be clear to those skilled in the art how to make and use memory 403.

Transmitter 404 is a circuit that is capable of receiving frames from processor 402, in well-known fashion, and of transmitting them on shared-communications channel 203. It will be clear to those skilled in the art how to make and use transmitter 404.

Figure 5:
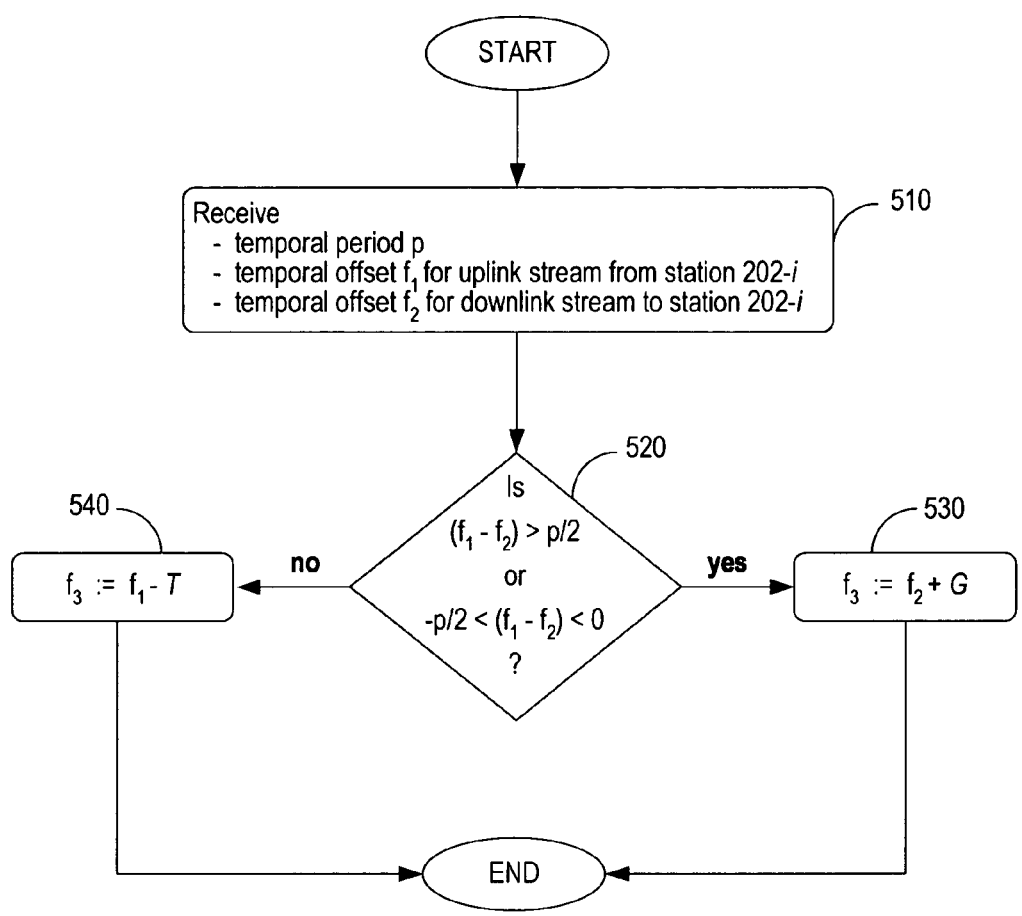
FIG. 5 depicts a flowchart of an algorithm for determining a temporal offset for access point 201's transmitting of downlink data/poll frames to a station 202-i when the temporal periods of the downlink stream to and uplink stream from station 202-i are equal, in accordance with the illustrative embodiment of the present invention.

FIG. 5 depicts a flowchart of an algorithm for determining a temporal offset for access point 201's transmitting of downlink data/poll frames to a station 202-i when the temporal periods of the downlink stream to and uplink stream from station 202-i are equal, in accordance with the illustrative embodiment of the present invention.

At task 510, (i) the temporal period $\pi$ of the uplink and downlink streams for station 202-i, (ii) the temporal offset $\phi_1$ for the uplink stream from station 202-i, and (iii) the temporal offset $\phi_2$ for the downlink stream to station 202-i, are received. As will be clear to those skilled in the art, these parameters might be provided by station 202-i, or the station that transmits the downlink traffic stream to station 202-i, or an observer (e.g., access point 201, a station 202-j, etc.), or some combination thereof.

At task 520, one or both of the following inequalities are tested: (i) $(\phi_1-\phi_2)>\pi/2$, and (ii) $-\pi/2<(\phi_1-\phi_2)<0$. If either one of these inequalities holds, execution proceeds to task 530, otherwise execution proceeds to task 540.

At task 530, a temporal offset variable $\phi_3$ is set to $\phi_2+G$, wherein G is a processing delay associated with generating a downlink data/poll frame based on the data payload of a frame received for forwarding to station 202-i. A downlink data/poll frame that is transmitted in accordance with this temporal offset $\phi_3$ is therefore sent soon after the downlink data/poll frame is generated. After completion of task 530, execution of the method of FIG. 5 terminates.

At task 540, temporal offset variable $\phi_3$ is set to $\phi_1-T$, wherein T is the transmission delay associated with transmitting a downlink data/poll frame to station 202-i. A downlink data/poll frame that is transmitted in accordance with this temporal offset $\phi_3$ therefore arrives at station 202-i soon after station 202-i has queued a frame for transmission. After completion of task 540, execution of the method of FIG. 5 terminates.

Figure 6:
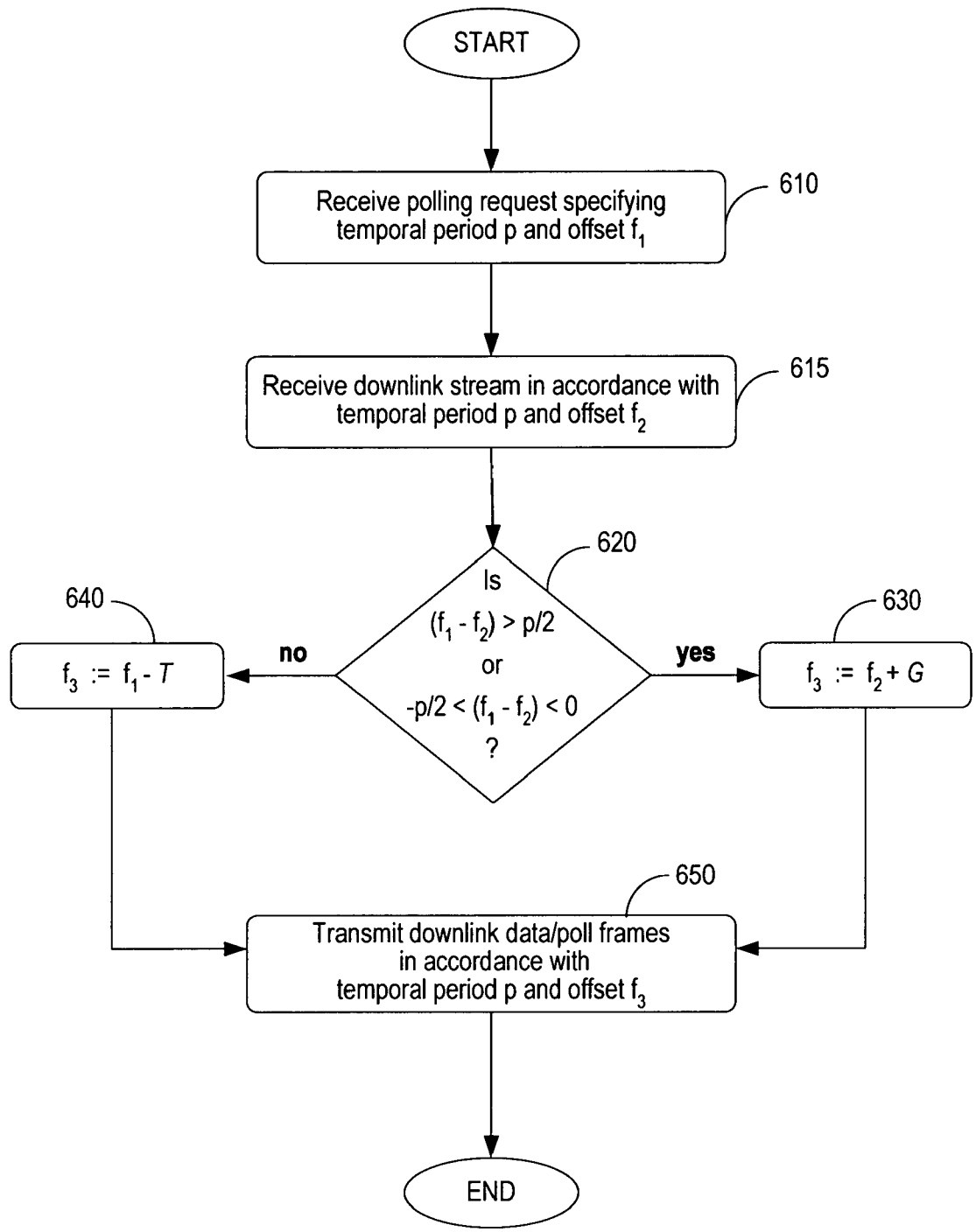
FIG. 6 depicts a flowchart of the salient tasks performed by access point 201 in executing the algorithm of FIG. 5 and transmitting a downlink data/poll frame to station 202-i accordingly.

FIG. 6 depicts a flowchart of the salient tasks performed by access point 201 in executing the algorithm of FIG. 5 and transmitting a downlink data/poll frame to station 202-i accordingly.

At task 610, access point 201 receives from a station 202-i a polling request that specifies a temporal period $\pi$ and temporal offset $\phi_1$ for a periodic uplink traffic stream.

At task 615, access point 201 receives a downlink traffic stream for forwarding to station 202-i, wherein the downlink traffic stream has a temporal period $\pi$ and temporal offset $\phi_2$.

At task 620, one or both of the following inequalities are tested: (i) $(\phi_1-\phi_2)>\pi/2$, and (ii) $-\pi/2<(\phi_1-\phi_2)<0$. If either one of these inequalities holds, execution proceeds to task 630, otherwise execution proceeds to task 640.

At task 630, a temporal offset variable $\phi_3$ is set to $\phi_2+G$, wherein G is a processing delay associated with generating a downlink data/poll frame based on the data payload of a frame received for forwarding to station 202-i. After completion of task 630, execution of the method of FIG. 6 terminates.

At task 640, temporal offset variable $\phi_3$ is set to $\phi_1-T$, wherein T is the transmission delay associated with transmitting a downlink data/poll frame to station 202-i. After completion of task 640, execution of the method of FIG. 6 terminates.

Figure 7:
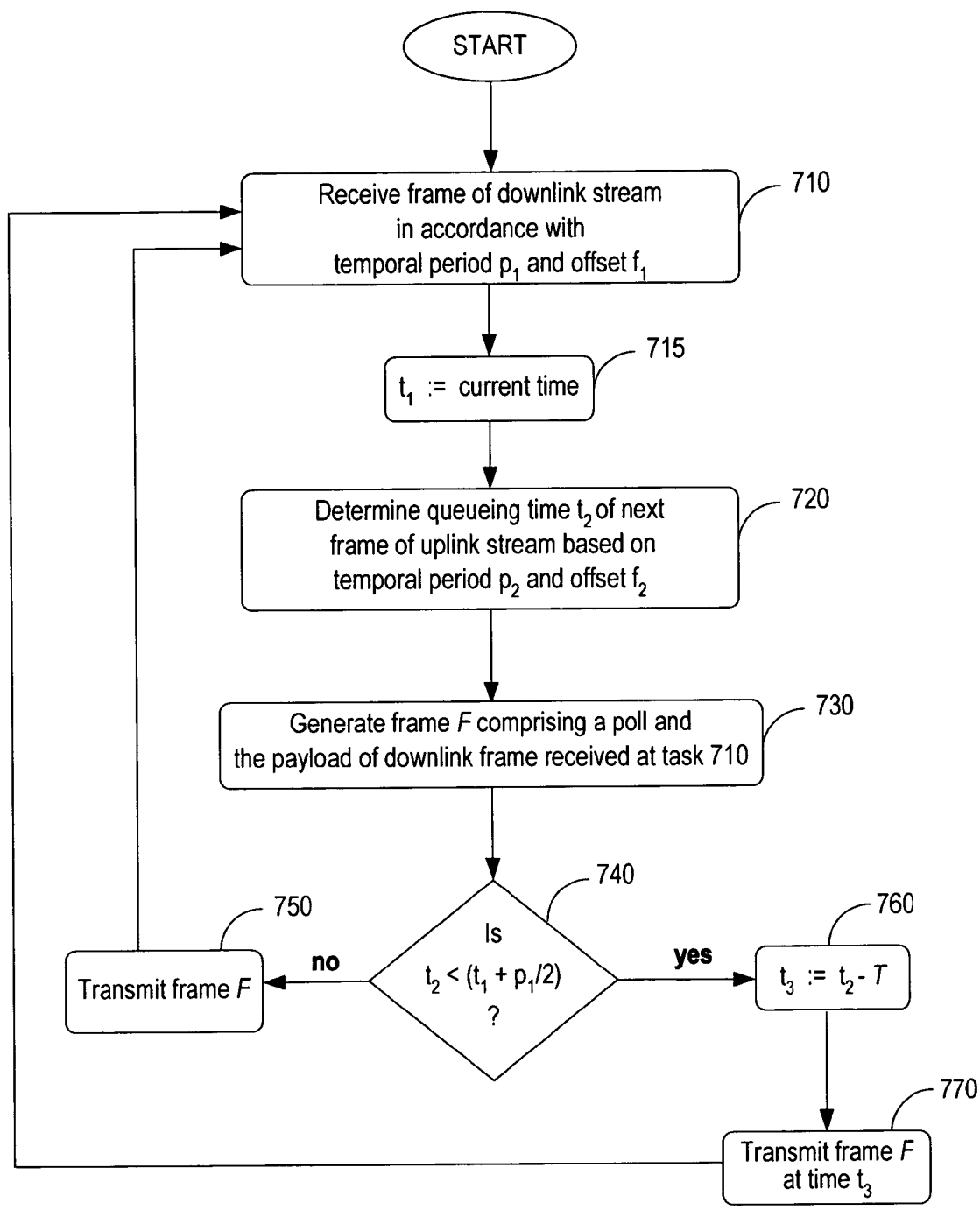
FIG. 7 depicts a flowchart of the salient tasks performed by access point 201 in determining when to transmit a downlink data/poll frame to a station 202-i when the temporal period of the downlink stream to station 202-i is less than the temporal period of the uplink stream from station 202-i, in accordance with the illustrative embodiment of the present invention.

FIG. 7 depicts a flowchart of the salient tasks performed by access point 201 in determining when to transmit a downlink data/poll frame to a station 202-i when the temporal period of the downlink stream to station 202-i is less than the temporal period of the uplink stream from station 202-i, in accordance with the illustrative embodiment of the present invention.

At task 710, access point 201 receives a frame of a downlink traffic stream for forwarding to station 202-i, wherein the downlink traffic stream has a temporal period $\pi_1$ and temporal offset $\phi_1$.

At task 715, access point 201 sets variable $\tau_1$ to the current time (i.e., the time at which the downlink frame is received at task 710).

At task 720, access point 201 determines the time $\tau_2$ at which the next uplink frame of station 202-i will be queued for transmission, based on the temporal period $\pi_2$ and temporal offset $\phi_2$ of 202-i's uplink traffic stream.

At task 730, access point 201 generates a frame F comprising a poll and the payload of the downlink frame received at task 710.

At task 740, access point 201 tests inequality $\tau_2<(\tau_1+\rho_1/2)$. If the inequality holds, execution proceeds to task 760, otherwise execution proceeds to task 750.

At task 750, access point 201 transmits frame F to station 202-i in well-known fashion. After completion of task 750, execution continues back at task 710.

At task 760, access point 201 sets variable $\tau_3$ to $\tau_2-T$, wherein T is the transmission delay associated with transmitting a downlink data/poll frame to station 202-i.

At task 770, access point 201 transmits frame F to station 202-i at time $\tau_3$ in well-known fashion. After completion of task 770, execution continues back at task 710.

Figure 8:
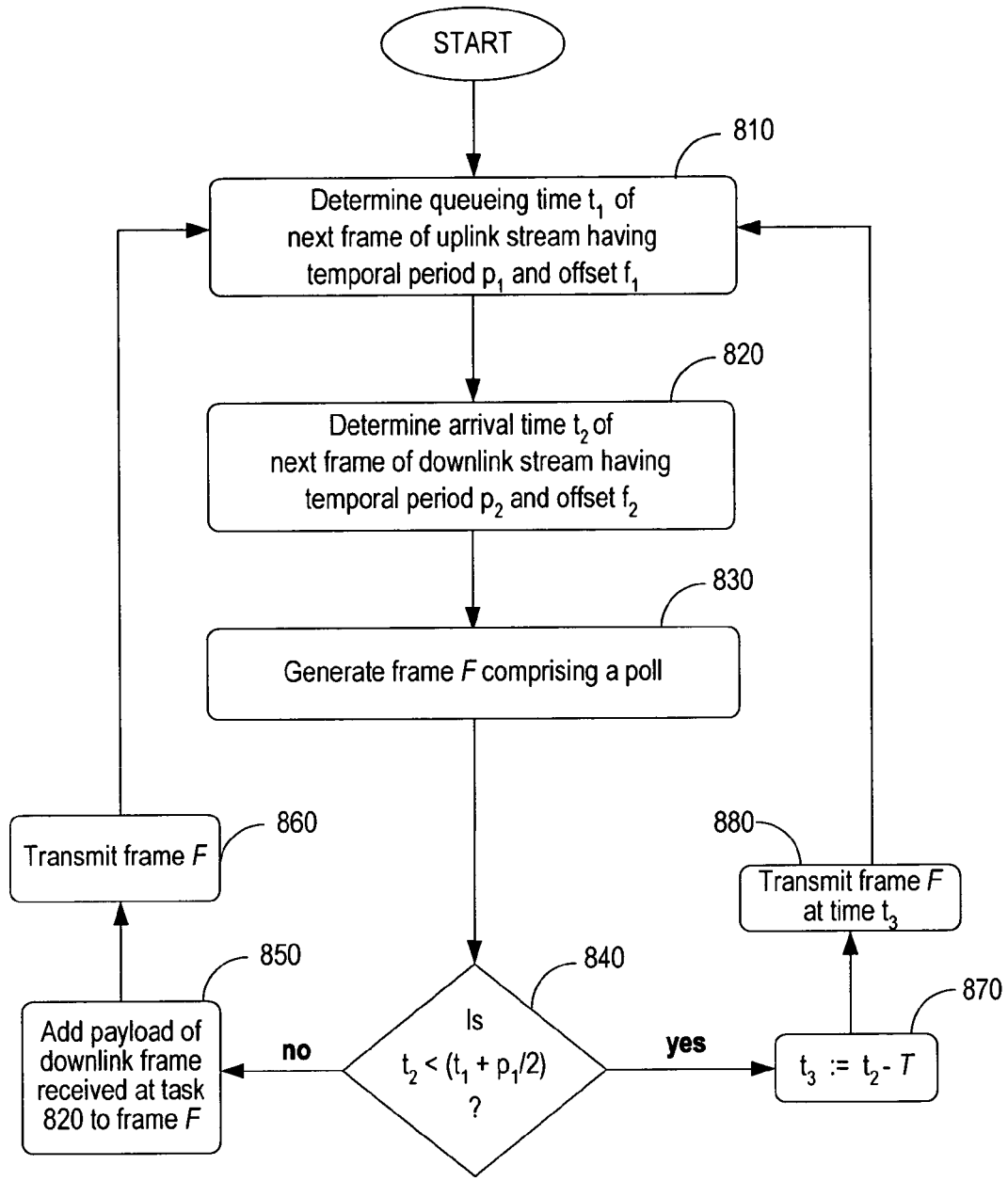
FIG. 8 depicts a flowchart of the salient tasks performed by access point 201 in determining when to transmit a downlink data/poll frame to a station 202-i, when the temporal period of the downlink stream to station 202-i is greater than the temporal period of the uplink stream from station 202-i, in accordance with the illustrative embodiment of the present invention.

FIG. 8 depicts a flowchart of the salient tasks performed by access point 201 in determining when to transmit a downlink data/poll frame to a station 202-i when the temporal period of the downlink stream to station 202-i is greater than the temporal period of the uplink stream from station 202-i, in accordance with the illustrative embodiment of the present invention.

At task 810, access point 201 determines the queueing time $\tau_1$ of the next frame of station 202-i's uplink traffic stream, where the uplink traffic stream has temporal period $\pi_1$, and temporal offset $\phi_1$.

At task 820, access point 201 determines the arrival time $\tau_2$ at access point 201 of the next frame of station 202-i's downlink traffic stream, where the downlink traffic stream has temporal period $\pi_2$ and temporal offset $\phi_2$.

At task 830, access point 201 generates a frame F comprising a poll.

At task 840, access point 201 tests inequality $\tau_2<(\tau_1+\pi_1/2)$. If the inequality holds, execution proceeds to task 870, otherwise execution proceeds to task 850.

At task 850, access point 201 adds the payload of the downlink frame received at task 820 to frame F.

At task 860, access point 201 transmits frame F to station 202-i in well-known fashion. After completion of task 860, execution continues back at task 810.

At task 870, access point 201 sets variable $\tau_3$ to $\tau_2-T$, wherein T is the transmission delay associated with transmitting a poll-only frame (i.e., no payload) to station 202-i.

At task 880, access point 201 transmits frame F to station 202-i at time $\tau_3$ in well-known fashion. After completion of task 880, execution continues back at task 810.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   (a) receiving
      (i) a temporal period $\pi$,
      (ii) a first temporal offset $\phi_1$ for a first stream of frames queued for transmission by a first device in accordance with said temporal period $\pi$, and
      (iii) a second temporal offset $\phi_2$ for a second stream of frames that arrives at a second device in accordance with said temporal period $\pi$, wherein said second stream of frames is for forwarding to said first device; and
   (b) determining a third temporal offset $\phi_3$ based on at least one of $\phi_1$ and $\phi_2$ for a third stream of frames transmitted from said second device to said first device in accordance with said temporal period $\pi$, wherein each frame of said third stream comprises a poll and a payload of a respective frame of said second stream.

2. The method of claim 1 wherein said determining said third temporal offset $\phi_3$ comprises selecting $\phi_3$ from one of
   (i) $\phi_1 - T$, wherein T is a transmission delay for a frame transmitted from said second device to said first device; and
   (ii) $\phi_2 + G$, wherein G is a processing delay associated with generating a frame of said third stream based on a respective frame of said second stream.

3. The method of claim 2 wherein $\phi_1 - T$ is selected for said third temporal offset $\phi_3$ when either one of
   (i) $0 \leq (\phi_1 - \phi_2) \leq \pi/2$, and
   (ii) $(\phi_1 - \phi_2) \leq -\pi/2$;

and wherein $\phi_2 + G$ is selected for said third temporal offset $\phi_3$ when either one of
   (i) $(\phi_1 - \phi_2) > \pi/2$, and
   (ii) $-\pi/2 < (\phi_1 - \phi_2) < 0$.

4. A method comprising:
   (a) receiving
      (i) a polling request from a device, wherein said polling request specifies a temporal period $\pi$ and a first temporal offset $\phi_1$ for a plurality of expected future transmissions, and
      (ii) a first stream of frames from at least one of a plurality of other devices in accordance with said temporal period $\pi$ and a second temporal offset $\phi_2$;
   (b) determining a third temporal offset $\phi_3$ based on at least one of $\phi_1$ and $\phi_2$; and
   (c) transmitting a second stream of frames to said device in accordance with said temporal period $\pi$ and said third temporal offset $\phi_3$, wherein each frame of said second stream comprises a poll and a payload of a respective frame of said first stream.

5. The method of claim 4 wherein said determining said third temporal offset $\phi_3$ comprises selecting $\phi_3$ from one of:
   (i) $\phi_1 - T$, wherein T is a transmission delay for transmitting a frame to said device; and
   (ii) $\phi_2 + G$, wherein G is a processing delay associated with generating a frame of said second stream from a poll and a payload of a respective frame of said first stream.

6. The method of claim 5 wherein $\phi_1 - T$ is selected for said third temporal offset $\phi_3$ when either one of:
   (i) $0 \leq (\phi_1 - \phi_2) \leq \pi/2$, and
   (ii) $(\phi_1 - \phi_2) \leq -\pi/2$;

and wherein $\phi_2 + G$ is selected for said third temporal offset $\phi_3$ when either one of:
   (i) $(\phi_1 - \phi_2) > \pi/2$, and
   (ii) $-\pi/2 < (\phi_1 - \phi_2) < 0$.

7. The method of claim 4 further comprising:
   (d) receiving a frame from said device; and
   (e) forwarding said frame to at least one of said plurality of other devices.

8. The method of claim 4 further comprising receiving at least one of:
   (i) said temporal period $\pi$, and
   (ii) said second temporal offset $\phi_2$.

9. The method of claim 4 wherein said receiving and said transmitting are via a shared-communications channel.

10. A method comprising:
    (a) receiving a first frame of a first stream of frames at a time $\tau_1$, wherein said first stream of frames is queued for transmission in accordance with a first temporal period $\pi_1$ and a first temporal offset $\phi_1$;
    (b) determining the time $\tau_2$ at which a second frame of a second stream of frames is queued for transmission, wherein said second stream of frames is queued for transmission by a device in accordance with a second temporal period $\pi_2$ and a second temporal offset $\phi_2$, and wherein $\pi_2 > \pi_1$; and
    (c) transmitting a third frame comprising a poll and the payload of said first frame to said device at a time $\tau_3$;
    wherein $\tau_3$ equals $\tau_2$ minus a transmission delay T when $\tau_2 < (\tau_1 + \pi_1/2)$; and
    wherein $\tau_3$ equals $\tau_1$ plus a processing delay G when $\tau_2 \geq (\tau_1 + \pi_1/2)$.

11. The method of claim 10 further comprising (d) receiving at least one of:
    (i) said first temporal period $\pi_1$,
    (i) said second temporal period $\pi_2$,
    (iii) said first temporal offset $\phi_1$, and
    (iv) said second temporal offset $\phi_2$.

12. The method of claim 10 wherein said receiving and said transmitting are via a shared-communications channel.

13. A method comprising:
    (a) determining the time $\tau_1$ at which the next frame $F_1$ of a first stream of frames will be queued for transmission by a device in accordance with a first temporal period $\pi_1$ and a first temporal offset $\phi_1$;
    (b) determining the time $\tau_2$ at which the next frame $F_2$ of a second stream of frames will be received, wherein said second stream of frames is queued for transmission in accordance with a second temporal period $\pi_2$ and a second temporal offset $\phi_2$, and wherein $\pi_2 > \pi_1$; and
    (c) transmitting a frame $F_3$ comprising a poll to said device at a time $\tau_3$;
    wherein $\tau_3$ equals $\tau_1$ minus a transmission delay T when $\tau_2 \geq (\tau_1 + \pi_1/2)$; and wherein
    (i) $\tau_3$ equals $\tau_2$ plus a processing delay G, and
    (ii) frame $F_3$ also comprises the payload of frame $F_2$ when $\tau_2 < (\tau_1 + \pi_1/2)$.

14. The method of claim 13 further comprising receiving at least one of:
    (i) said first temporal period $\pi_1$,
    (i) said second temporal period $\pi_2$,
    (iii) said first temporal offset $\phi_1$, and
    (iv) said second temporal offset $\phi_2$.

15. The method of claim 13 wherein said transmitting is via a shared-communications channel.

16. An apparatus comprising:
    (a) a receiver for receiving:
       (i) a polling request from a device, wherein said polling request specifies a temporal period $\pi$ and a first temporal offset $\phi_1$ for a plurality of expected future transmissions, and
       (ii) a first stream of frames from at least one of a plurality of other devices in accordance with said temporal period $\pi$ and a second temporal offset $\phi_2$;
    (b) a processor for determining a third temporal offset $\phi_3$ based on at least one of $\phi_1$ and $\phi_2$; and
    (c) a transmitter for transmitting a second stream of frames to said device in accordance with said temporal period $\pi$ and said third temporal offset $\phi_3$, wherein each frame of said second stream comprises a poll and a payload of a respective frame of said first stream.

17. The apparatus of claim 16 wherein said determining said third temporal offset $\phi_3$ comprises selecting $\phi_3$ from one of:
(i) $\phi_1-T$, wherein T is a transmission delay for transmitting a frame to said device; and
(ii) $\phi_2+G$, wherein G is a processing delay associated with generating a frame of said second stream from a poll and a payload of a respective frame of said first stream.

18. The apparatus of claim 17 wherein $\phi_1-T$ is selected for said third temporal offset $\phi_3$ when either one of:

(i) $0 \leq (\phi_1-\phi_2) \leq \pi/2$, and (ii) $(\phi_1-\phi_2) \leq -\pi/2$;

and wherein $\phi_2+G$ is selected for said third temporal offset $\phi_3$ when either one of:

(i) $(\phi_1-\phi_2) > \pi/2$, and (ii) $-\pi/2 < (\phi_1-\phi_2) < 0$.

19. The apparatus of claim 16 wherein said transmitter is also for forwarding at least one of said first stream of frames to at least one of said plurality of other devices.

20. The apparatus of claim 16 wherein said receiver is also for receiving at least one of:
(i) said temporal period $\pi$,
(ii) said first temporal offset $\phi_1$, and
(iii) said second temporal offset $\phi_2$.

\* \* \* \* \*